(12) United States Patent
Park (10) Patent No.: US 9,397,817 B2
(45) Date of Patent: Jul. 19, 2016

(54) METHODS, SYSTEMS AND APPARATUSES TO MITIGATE COMMUNICATION COLLISIONS

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,708

(22) PCT Filed: Apr. 24, 2012

(86) PCT No.: PCT/US2012/034807
§ 371 (c)(1),
(2), (4) Date: Mar. 19, 2014

(87) PCT Pub. No.: WO2013/077903
PCT Pub. Date: May 30, 2013

(65) Prior Publication Data
US 2014/0334458 A1    Nov. 13, 2014

Related U.S. Application Data

(60) Provisional application No. 61/562,184, filed on Nov. 21, 2011.

(51) Int. Cl.
*H04J 3/00* (2006.01)
*H04L 5/00* (2006.01)
(Continued)

(52) U.S. Cl.
CPC ............ *H04L 5/0073* (2013.01); *H04L 5/0037* (2013.01); *H04W 72/0446* (2013.01); *H04W 72/1221* (2013.01); *H04W 72/1289* (2013.01)

(58) Field of Classification Search
CPC ....... H04L 5/00; H04L 5/0073; H04L 5/0037; H04W 72/0446; H04W 72/1221

USPC .......................................................... 370/336
See application file for complete search history.

(56) References Cited

U.S. PATENT DOCUMENTS

2005/0002420 A1    1/2005  Jeanne et al.
2005/0047386 A1*   3/2005  Yi ................................. 370/345
(Continued)

FOREIGN PATENT DOCUMENTS

EP    1265402 A2    12/2002
EP    1 548 987 A2   6/2005
(Continued)

OTHER PUBLICATIONS

Extended European Search Report received for European Patent Application No. 12851852.9, mailed on Mar. 12, 2015, 10 pages.
(Continued)

*Primary Examiner* — Sai-Ming Chan
(74) *Attorney, Agent, or Firm* — Schubert Law Group PLLC (57) ABSTRACT

Embodiments may comprise logic such as hardware and/or code to mitigate or attenuate collisions of communications between wireless communications devices and access points by defining time slots for stations to communicate with the access point. Some embodiments may define time slots for stations to respond to an indication that the access point is buffering data for the station. Further embodiments may define time slots for stations to communicate with the access point whether there is data buffered for the station or not. And many embodiments may determine stations associated with communications collisions or likely to be associated with communications collisions and defines different time slots for the stations to communicate with the access point.

10 Claims, 6 Drawing Sheets

(51) Int. Cl.
*H04W 72/04* (2009.01)
*H04W 72/12* (2009.01)

(56) References Cited

U.S. PATENT DOCUMENTS

| | | |
|---|---|---|
| 2005/0064818 A1 | 3/2005 | Assarsson et al. |
| 2007/0201468 A1 | 8/2007 | Jokela |
| 2009/0040974 A1 | 2/2009 | Goldhamer |
| 2010/0039960 A1* | 2/2010 | Sugaya .................. 370/255 |

FOREIGN PATENT DOCUMENTS

| | | |
|---|---|---|
| EP | 1 865 664 A2 | 12/2007 |
| WO | 2005/027420 A1 | 3/2005 |
| WO | 2008/104095 A1 | 9/2008 |
| WO | 2013/077903 A1 | 5/2013 |

OTHER PUBLICATIONS

Liu et al., "DCF Enhancements for Large Number of STAs", IEEE 802.11-11-1255r0, Sep. 15, 2011, 11 pages.
International Preliminary Report on Patentability and Written Opinion received for PCT Patent Application No. PCT/US2012/034807, mailed on Jun. 5, 2014, 7 pages.
International Search report and Written Opinion received for PCT Patent Application No. PCT/US2012/034807, mailed on Nov. 26, 2012, 10 pages.
Translation of Office Action Received for Russian Patent Application No. 2014122164, Mailed on Oct. 16, 2015, 5 pages.
Office Action Received for Canadian Patent Application No. 2,856,066, Mailed on Nov. 30, 2015, 3 pages of Office Action and 2 pages of Examination Search Report.

* cited by examiner

METHODS, SYSTEMS AND APPARATUSES TO MITIGATE COMMUNICATION COLLISIONS

BACKGROUND

The present disclosure relates generally to the field of wireless communications technologies. More particularly, the present disclosure relates to mitigate collisions of communications.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments for mitigating communication collisions are described herein. Embodiments may comprise logic such as hardware and/or code to mitigate or attenuate collisions of communications between wireless communications devices and an access point by defining time slots for stations to communicate with the access point. Some embodiments may define time slots for stations to respond to an indication that the access point is buffering data for the station. Further embodiments may define time slots for stations to communicate with the access point whether there is data buffered for the station or not. And many embodiments may determine stations associated with communication collisions, or likely to be associated with communication collisions, and define distinct time slots for the stations to communicate with the access point. For instance, some embodiments may separate time slots for devices associated with communication collisions into different beacon intervals, different beacon frames, and/or different traffic indication maps elements.

Various embodiments may be designed to address different technical problems associated with communication collisions. For instance, some embodiments may be designed to address one or more technical problems related to hidden nodes. The technical problem of hidden nodes may involve problems arising from extended communication ranges leading to lower power transmissions, lower power consumption stations leading to lower power transmissions, lower data rates leading to lower receiver sensitivities, increased numbers of stations associated with an access point leading to increased probabilities for communication collisions, identifying stations associated with communication collisions, and the like.

Further embodiments may be designed to address one or more other technical problems such as defining time slots for communications between stations and the access point and communicating or transmitting time slots from the transmitting device to the receiving device. In several embodiments, the technical problems may involve receiving communications from an access point that defines time slots for communications, determining time slots for communications between stations and the access point, and interpreting communications of time slots from the access point to the receiving device. Other technical problems may involve generating a frame for defining time slots for communications, identifying that a frame defines time slots, and parsing and interpreting the frame that defines time slots.

Technical problems such as one or more of the technical problems discussed above have not been known in the art until discovery and teaching represented by this disclosure. A lack of understanding of technical problems led to the failure of current art to conceive of, discuss, and describe the solutions such as the solutions described by this disclosure. In other words, the solutions presented herein were not obvious in the art due at least in part to a lack of knowledge of the technical problems by other persons of skill in the art.

Different technical problems such as those discussed above may be addressed by one or more different embodiments. For instance, some embodiments that are designed to address communication collisions may do so by one or more different technical means such as maintaining association request and response frame structures including indicators of a collision mitigation scheme and maintaining a beacon frame structure including a traffic indication map (TIM) element structure in memory. Some embodiments may include logic to generate and transmit the association response frame and beacon frame in the medium access control (MAC) sublayer. Further embodiments may include logic to generate and transmit the association request frame and receive, parse and interpret a beacon frame in the MAC sublayer.

Further embodiments that are designed to address the technical problem of communication collisions may do so by one or more different technical means such as determining a slot boundary for a contention window defined for a station. Still further embodiments that are designed to address the technical problem communication collisions may do so by one or more different technical means such as determining a new association identifier for a station involved or potentially involved in a communication collision and reassigning the association identifier to the station. Further embodiments that are designed to address the technical problem communication collisions may do so by one or more different technical means such as determining a slot boundary for a contention window defined for a station with fair access logic. In some of these embodiments, the fair access logic may comprise a permutation table to rotate or otherwise alternate assignments of time slots to stations associated with a traffic indication map.

Some embodiments implement a 1 Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet. According to one embodiment, the efficiency of the protocol may be improved by mitigating communication collisions, which can enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
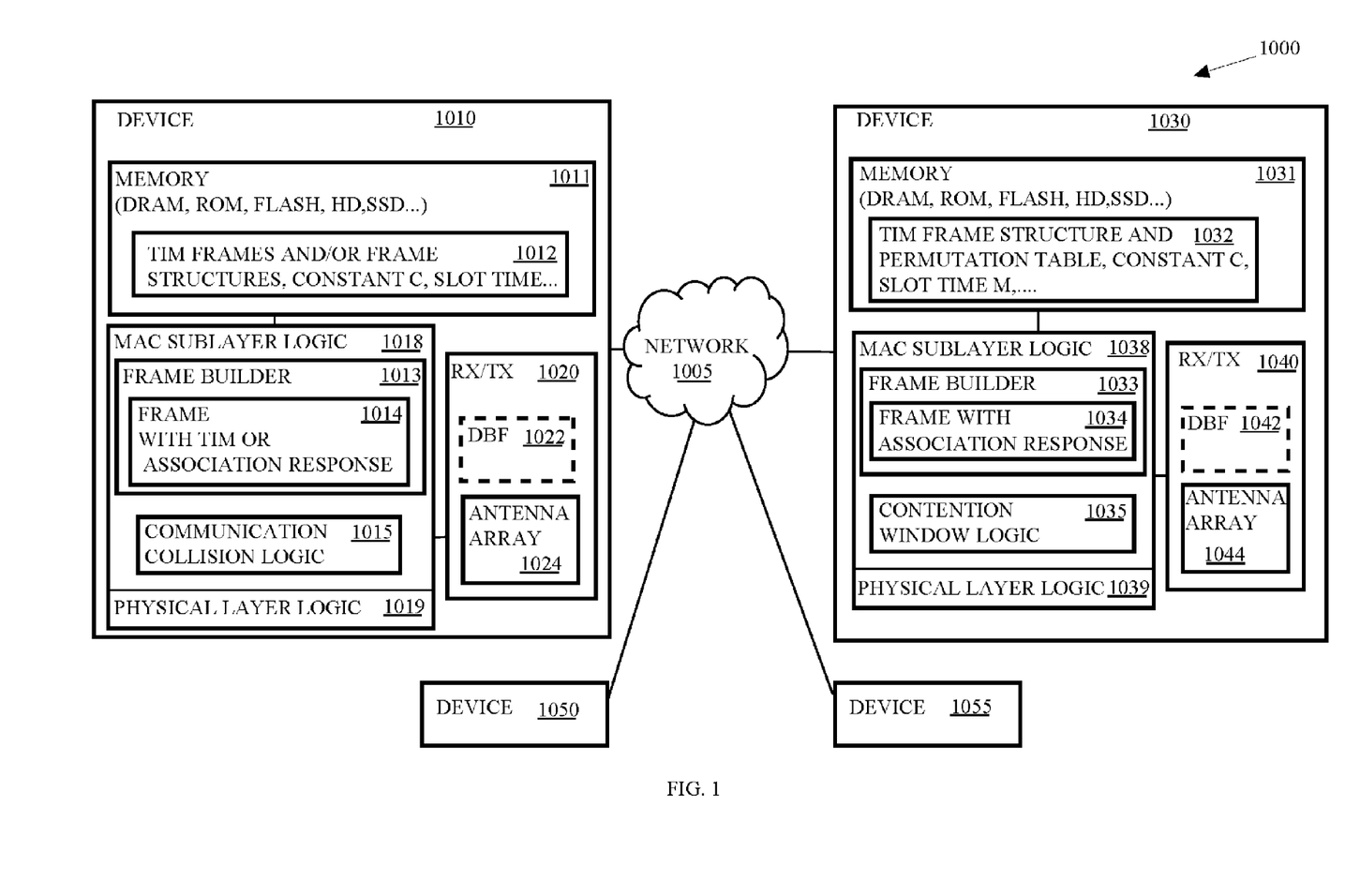
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

Initially, the communications device 1030 may receive a beacon from communications device 1010 identifying that communications device 1010 is an access point in the transmission range of communications device 1030. For instance, a frame builder 1033 of communications device 1010 may generate or select a frame based upon a frame structure 1012 in memory 1011 of communications device 1010. The medium access control (MAC) sublayer logic 1018 may communicate with the physical layer (PHY) logic 1019 to transmit the frame to the PHY logic 1039 of communications device 1030.

In response, medium access control (MAC) sublayer logic 1038 of communications device 1030 may generate an association request frame 1034 to request an association with communications device 1010. Within the association request frame 1030, communications device 1030 may identify capabilities of communications device 1030 such as a capability to reassign an identification, determine a time slot during which to communicate with the communications device 1010 based upon one or more predetermined methods, and/or the like.

The communications device 1010 may determine a communication collision mitigation scheme in response to the association request or may have a predetermined or default communication collision mitigation scheme. The communications device 1010 may respond to the association request by defining or identifying the communications collision mitigation scheme in an association response frame and transmit the frame to communications device 1030. In further embodiments, the communications device 1010 may implement a predetermined communications collision mitigation scheme and define the predetermined communication collision mitigation scheme in the association response frame. In some embodiments, the communications device 1010 may also determine a slot time or have a predetermined slot time in memory 1012. In some embodiments, the communications device 1010 may also include the slot time in the association response frame. Then the communications device 1010 may transmit the association response frame to the communications device 1030.

Upon receiving the association response frame, the MAC sublayer logic 1038 of the communications device 1030 may parse and interpret the association response frame based upon a structure for association response frame in memory 1031. The communications device 1030 may determine that the communications device 1010 has defined the slot time for communications device 1030, has identified a method of determining a time slot or a boundary for a time slot, and has assigned an association identifier to the communications device 1030 for subsequent communications.

In some embodiments, for instance, communication collision logic 1015 of the communications device 1010 may define a time slot, or slot boundary, by reassigning an association identifier to the communications device 1030. In such embodiments, the communication collision logic 1015 may reassign the association identifier to assign a new association identifier to the communications device 1030 to separate the time slot for the communications device 1030 from the time slot of another communications device such as the communications device 1050. The communication collision logic 1015 may reassign the association identifier to the communications device 1030 as a result of a communications collision with the communications device 1050 or at least an indication that the communications device 1030 may have a communications collision with the communications device 1050. In many of these embodiments, the communications device 1010 may assign the new association identifier to the communications device 1030 to cause the TIM in which new association identifier falls to be transmitted by the communications device 1010 in a different MPDU or, in several embodiments, in a different beacon interval than the association identifier for the communications device 1050. In other words, if an administrator or the communications collision logic 1015 of communications device 1010 identifies a collision or potential collision between communications of communications devices 1030 and 1050, the communication collision logic 1015 may change the association identifier of at least one of these two devices to ensure that at least a single TIM element does not comprise the association identifiers of both the communications devices 1030 and 1050. And, in many embodiments, the communication collision logic 1015 may change the association identifier of at least one of these two devices to ensure that a single beacon does not comprise the association identifiers of both the communications devices 1030 and 1050.

In further embodiments, the communication collision logic 1015 may define a time slot, or slot boundary, by identifying a method of determining a time slot, or slot boundary, to the communications device 1030. In some embodiments, the communication collision logic 1015 may define a time slot, or slot boundary, by defining a statistical method of determining a slot time along with a method of determining a time slot based upon the slot time. In other embodiments, the communications collision logic 1015 may define a time slot, or slot boundary, by defining a deterministic method of determining a slot time along with a method of determining a time slot based upon the slot time.

Figure 1A:
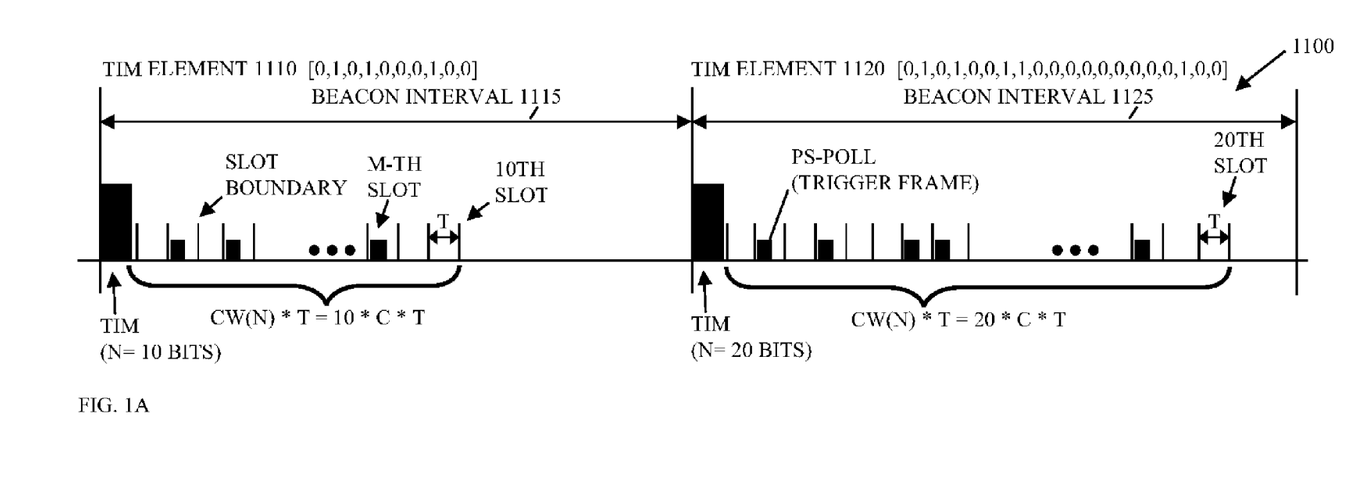
FIG. 1A depicts an embodiment of a timing diagram for a contention window assignment for establishing communications between wireless communication devices.

FIG. 1A illustrates an example of an embodiment of a timing diagram 1100 for a statistical method of defining a time slot or slot boundary. In this embodiment, communications device 1010 transmits a beacon with a TIM element 1110. The TIM element 1110 lists in order, ten sequential association identifiers with either a logical one value or a logical zero value. TIM elements may also include other fields that are not illustrated in FIG. 1A such as an offset field to identify an offset value that can be used in combination with the positions of the bits in the lists to determine the complete association identifier of the communications devices associated with the TIM element 1110.

The logical one values of TIM elements 1110 and 1120 identify association identifiers for which the communications device 1010 may be buffering data and the logical zeros identify association identifiers for which the communications device 1010 may not be buffering data during the beacon intervals 1115 and 1125, respectively. The communications device 1010 may include one or more bits in the association response frame that identifies a method of calculating a time slot, or slot boundary, such as multiplying a slot time, T, defined by the communications device 1010 (or predefined in memory) by a random number, M. The communications device 1010 may define a slot time as, e.g., 5 milliseconds (ms), 10 ms, or 20 ms, and the communications device 1030 may multiply a random number that is greater than or equal to one and less than or equal to the total number of time slots in a beacon interval to determine the time slot, or slot boundary, defined by the communications device 1010 for communication with communications device 1030. In the beacon interval 1115 of the present embodiment, the total number of time slots, N, may be equal to the total number of stations represented in the TIM element 1110, i.e., N equals ten. Similarly, for beacon interval 1120, N equals 20 because 20 association identifiers are included in the TIM element 1125.

In other embodiments, the method of calculating a time slot, or slot boundary, may involve determining time slots or slot boundaries only for the association identifiers in the TIM element 1110 for which the TIM element 1110 indicates that the communications device 1010 is buffering data. For example, TIM element 1110 only includes three bits set to a logical one, which indicates that communications device 1010 is buffering data for three communications so, in some embodiments, N equals three. Similarly, for beacon interval 1120, N equals five because five association identifiers are set to a logical one in the TIM element 1125.

For example, TIM element 1110 includes logical ones at the bit positions 2, 4, and 7 (bit position 7 being identified as the M-th slot). For the communications device having an association identifier identified by the M-th bit, contention window logic of the communications device determines the time slot, or slot boundary, by multiplying the slot time, T, by a random number, R, and the contention window, CW(N) equals N multiplied by a constant, C, wherein C is greater than or equal to one. For embodiments in which time slots are only defined for association identifiers that are associated with a logical one in the TIM element 1110, the number of time slots, N, equals three so the contention window is three times C, and CW(N) times T equals CW(3)*T, which is three times C times T. The constant may be predetermined and may reside in memory of communications devices 1030, 1050, and 1055. In other embodiments, the communications device 1010 may transmit the constant value C to the communications devices 1030, 1050, and 1055.

In some embodiments, each of the stations such as the communications devices 1030, 1050, and 1055, may comprise fair access logic in contention window logic such as contention window logic 1035. The fair access logic, which is illustrated in FIG. 1E, may change the time slots associated with communications devices in different beacon intervals such as beacon intervals 1115 and 1125 to provide fair access to each of the time slots by the communications devices. Other embodiments may generate a different random number to determine the time slot for the communications device at each beacon interval or periodically rather than utilizing fair access logic.

Figure 1B:
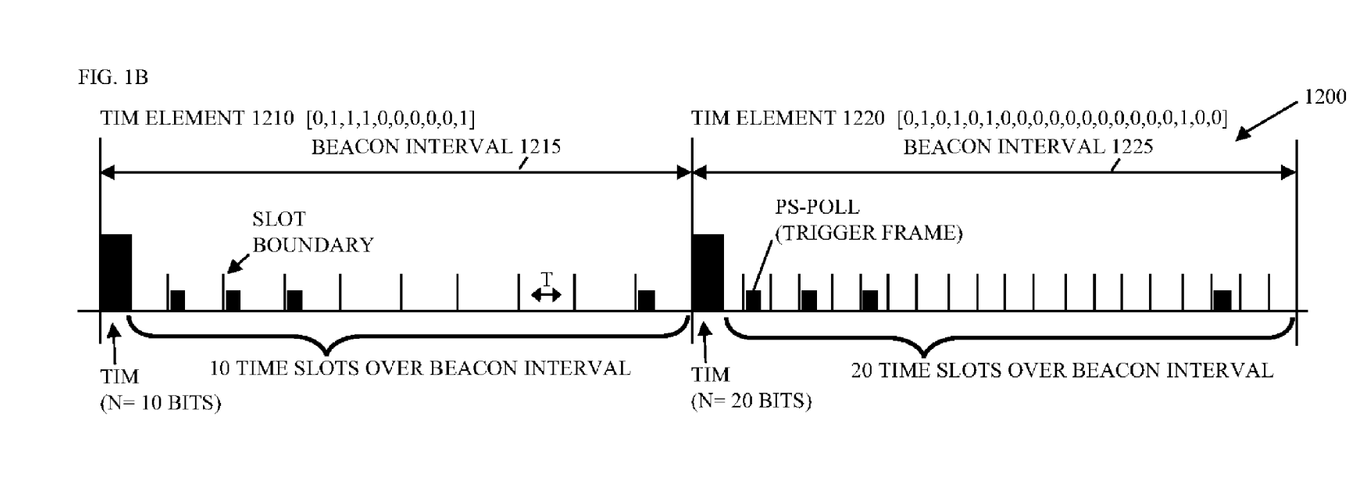
FIG. 1B depicts an alternative embodiment of a timing diagram for a contention window assignment for establishing communications between wireless communication devices.

FIG. 1B illustrates an example of an embodiment of a timing diagram 1200 for a deterministic method of defining a time slot, or slot boundary. In this embodiment, communications device 1010 transmits a beacon with a TIM element 1210 during a first beacon interval 1215 and TIM element 1220 during a second beacon interval 1225. The deterministic method of calculating a time slot, or slot boundary, may comprise multiplying a slot time, T, defined by the communications device 1010 or predefined in memory by a bit position of the association identifier for the communications device 1030 within the TIM element 1210. For example, TIM element 1210 includes logical ones at the bit positions 2, 3, 4, and 10 and the number of time slots is ten (N=10). The slot time may be defined as in the statistical method or may be equal to the beacon interval 1210 divided by the number of time slots (T=beacon interval/10 time slots). For the communications device having an association identifier identified by the M-th bit, the communications device determines the time slot, or slot boundary, by multiplying the slot time, T, by the bit position, M. For embodiments in which time slots are only defined for association identifiers that are associated with a logical one in the TIM element 1210, there are four time slots in the beacon, so the time slot is the bit position times the beacon interval divided by four.

In some embodiments, each of the stations such as the communications devices 1030, 1050, and 1055, may comprise fair access logic in the contention window logic such as contention window logic 1035. The fair access logic, which is illustrated in FIG. 1E, may change the time slots associated with bit positions in different beacon intervals such as beacon intervals 1215 and 1225 to provide fair access to each of the time slots by the communications devices.

Once the communication collision logic 1015 determines the method of the calculating the time slots, the MAC sublayer logic 1018 may generate an association response frame 1014 and transmit the response frame to communications device 1030 to define the time slots for the communications device 1030. Contention logic 1035 of the communications device 1030 may then determine or select the method of the calculating the time slots and await receipt of a beacon associated with communications device 1030.

At periodic intervals, the communications device 1010 may generate and transmit packets such as beacons with TIM elements to identify the stations such as communications device 1030 that have data buffered at the communications device 1010. The communications device 1030 may receive the packet, parse and interpret the beacon to determine that the beacon comprises an indication that data is buffered at the communications device 1010 for the communications device 1030. Based upon the method of determining the time slot defined for communications between the communications devices 1010 and 1030, the contention window logic 1035 may determine the time slot, or slot boundary. The contention window logic 1035 may then, generate a trigger frame 1034 via frame builder 1033 such as a poll frame or a power-saving poll frame and transmit the trigger frame 1034 via physical layer logic 1039 to the communications device 1010 to request that the data buffered by the communications device 1010 be transmitted to the communications device 1030. In many embodiments, the communications device 1010 may also transmit the data to the communications device 1030 within the time slot defined for communications between the communications devices 1010 and 1030.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the TIM frames and/or the frame structures, and the memory 1011 and 1031 may store a constant C and a slot time for implementing a statistical method and/or deterministic method of determining time slots.

In many embodiments, the TIM frames, association request frames, and association response frames may comprise fields based upon the structure of the standard frame structures identified in IEEE 802.11.

Figure 1C:
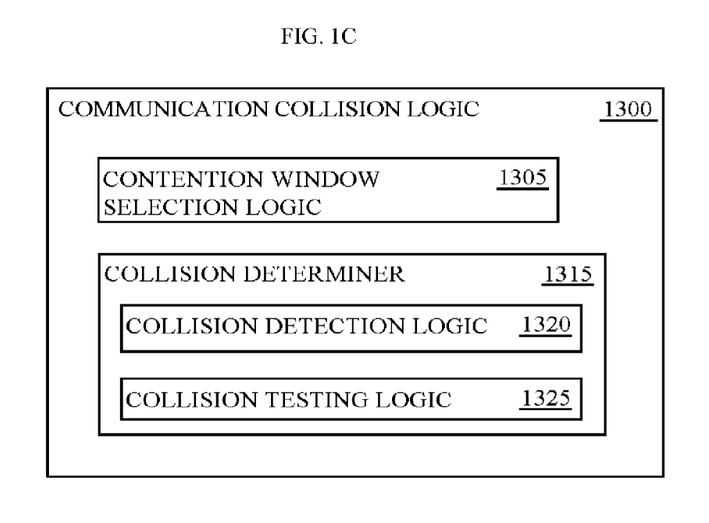
FIG. 1C depicts an embodiment of communication collision logic for the system illustrated in FIG. 1.

FIG. 1C illustrates an embodiment of communication collision logic 1300 such as the communication collision logic 1015 illustrated in FIG. 1. The communication collision logic 1300 may determine or select a method of calculating a time slot based upon communication with one or more stations such as communication devices 1030, 1050, and 1055 illustrated in FIG. 1. In some embodiments, the method selected may be based upon capabilities indicated by stations associated with the access point. In some embodiments, the method may be selected based upon capabilities of the access point. In further embodiments, the communication collision logic 1300 may define the method of determining the slot times for stations to communicate with an access point such as the communications device 1010 based upon a predetermined definition of the method for the access point.

The communication collision logic 1300 may comprise contention window selection logic 1305 and a collision determiner 1315. The contention window selection logic 1305 may select a contention window calculation method from one or more statistical methods as discussed above and/or from one or more deterministic methods as discussed above. For instance, if multiple or all stations associated with the access point are capable of permuting a bit position to provide fair access to slot times by stations identified in beacons, then the contention window selection logic 1305 may define the slot times based upon permuting the bit positions to determine slot times for stations to communicate with the access point.

On the other hand, if not all or many of the stations are not capable of deterministic methods of calculating the slot times then the contention window selection logic 1305 may define a statistical method of determining slot times.

In further embodiments, the contention window selection logic 1305 may switch between two or more different methods of determining the slot times, measure the results by collecting data about communication collisions and efficiency/quality of communications between the stations and the access point to determine which of the methods provides more efficient communications and/or power usage by the stations.

The collision determiner 1315 may comprise logic to determine when a communication collision occurred or is likely to occur, or may determine receipt of an indication that the communication collision is likely to occur between two or more stations due to, e.g., hidden node issues. In response, the collision determiner 1315 may change the association identifier of one or more stations to increase the time span between slot times defined for the stations. For instance, an administrator may indicate via a user interface that two or more stations are candidates for hidden node issues due to the distances between the stations. The collision determiner 1315 may, in response, either test the stations for communication collisions or change an association identifier of one or more of the stations.

In the present embodiment, the collision determiner 1315 comprises collision detection logic 1320 and collision testing logic 1325. The collision detection logic 1320 may monitor communications for a communication collision and identify the stations involved with the collision either directly by detecting the stations' association identifiers or indirectly by testing or otherwise contacting the stations. For example, two stations may transmit packets to the access point in overlapping time periods and the access point may be capable of determining the association identifiers of both stations despite the collision.

If the access point determines that there is a potential communication collision between two or more stations, the collision testing logic 1325 of the access point may transmit packets to the two or more stations to test to determine if there is a communication collision. For example, the collision testing logic 1325 may transmit a packet with data to both the stations to trigger a response from the two stations at the same time. The collision testing logic 1325 may then monitor the communications from the two stations to determine if one or both of the stations are incapable of detecting the communications of the other station with the access point.

Once the collision detection logic confirms a collision between two stations, the communication collision logic 1300 may reassign an association identifier to one or both of the stations to separate the time slots defined for the stations. For statistical methods of determining time slots that multiply a random number by the slot time to determine the time slot, the communication collision logic 1300 may determine that the association identifiers for the stations will be separated into separate beacon intervals and, thus, included in separate beacon frames. In some embodiments, the access point may maintain a list of stations involved with communication collisions at least temporarily in memory such as memory 1011 illustrated in FIG. 1.

Figure 1D:
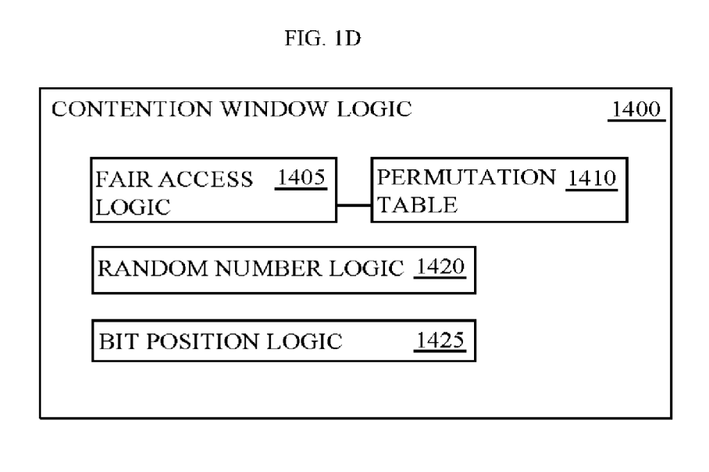
FIG. 1D depicts an embodiment of contention window logic illustrated in FIG. 1.

FIG. 1D illustrates an embodiment of contention window logic 1400 such as the contention window logic 1035 illustrated in FIG. 1. The contention window logic 1400 may calculate a slot time for a station such as communications device 1030 illustrated in FIG. 1. The contention window logic 1400 may calculate a slot time, or slot boundary, based upon slot time defined for the station by an access point such as the communications device 1010 illustrated in FIG. 1. The contention window logic 1400 may comprise fair access logic 1405, permutation table 1410, random number logic 1420, and bit position logic 1425. The fair access logic 1405 may implement an algorithm or process for increasing the fair access by stations of time slots for communications with the access point. For instance, the method of calculating the slot times may involve determining a bit position via bit position logic 1425 and multiplying the bit position by the slot time. In such embodiments, the fair access logic 1405 may generate a number based upon a bit position that can substitute for the bit position in calculating the slot time to change the order of time slots assigned to each station across different beacon intervals so that the same station does not have to first time slot in every beacon interval in which the beacon includes the association identifier for the station. In other words, the bit position, B, may be input into the fair access logic 1405 and the fair access logic may output Q. The contention window logic 1400 may then calculate the time slot for communications with the access point by multiplying Q by the slot time.

In some embodiments, the fair access logic 1405 is implemented with a permutation table 1410 that is maintained in memory of all or many of the stations. For instance, the fair access logic 1405 may utilize the permutation table 1410 to determine a number based upon the bit position and, periodically, the input sequence for the permutation table may be shifted based upon information in a beacon frame such as a beacon number, a count for receipt of beacon frames, or other sequence number that can differentiate beacon numbers or TIM elements of beacons.

The random number logic 1420 may comprise logic to determine a random number for multiplying by a slot time, T, to determine a time slot for the station to communicate with the access point.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames 1014, 1034. The PHY logic 1019, 1039 may generate physical layer protocol data units (PPDUs) based upon the frames 1014. More specifically, the frame builders 1013 and 1033 may generate the frames 1014, 1034 and data unit builders of the PHY logic 1019, 1039 may encapsulate the frames 1014, 1034 with preambles to generate PPDUs for transmission via a physical layer device such as the transceivers (RX/TX) 1020 and 1040.

The frame 1014, also referred to as a MAC layer Service Data Unit (MSDU), may comprise a management frame. For example, frame builder 1013 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030.

The communications devices 1010, 1030, 1050, and 1055 may each comprise a transceiver such as transceivers 1020 and 1040. Each transceiver 1020, 1040 comprises an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. Guard tones may be inserted between symbols such as the short training field (STF) and long training field (LTF) symbols during transmission to avoid inter-symbol interference (ISI), which might result from multi-path distortion. These guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
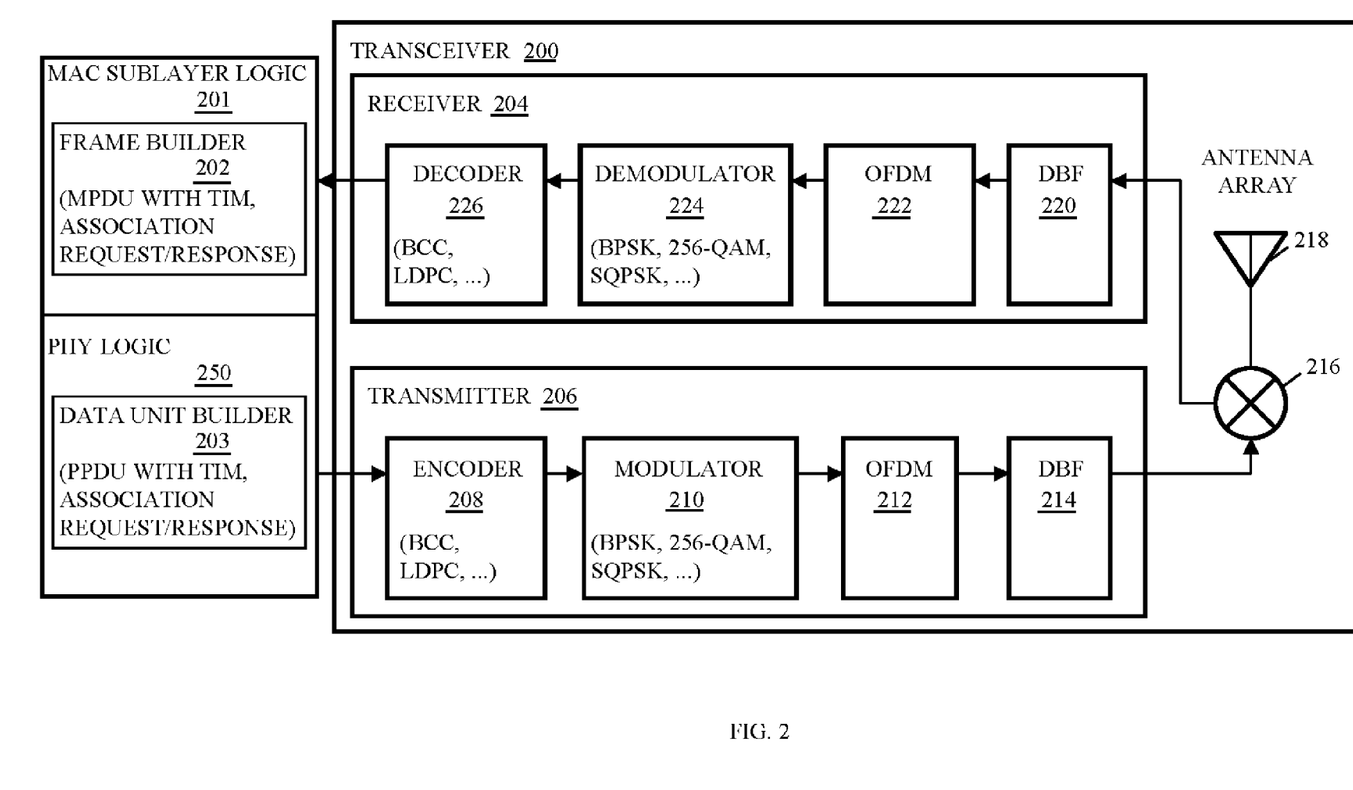
FIG. 2 depicts an embodiment of an apparatus to mitigate communication collisions.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame such as an association request frame, an association response frame, or a beacon frame, and transmit the frame to the physical layer (PHY) logic 250. The PHY logic 250 may determine the PPDU by determining a preamble and encapsulating the frame with a preamble to transmit via transceiver 200.

In many embodiments, the MAC sublayer logic 201 may comprise a frame builder 202 to generate frames (MPDUs). For embodiments such as communications devices that associate with an access point, the MAC sublayer logic 201 may generate an association request that includes fields descriptive of capabilities of the communications device. The MAC sublayer logic 201 may then receive and parse and interpret an association response frame to determine the slot times defined for the communications device. Such embodiments may wait for a beacon frame from the access point, and parse and process the traffic indication map (TIM) element to determine a slot time for transmitting a trigger frame to initiate transmission of data buffered for the communications device by the access point.

For embodiments such as access points, the MAC sublayer logic 201 may comprise a frame builder 202 to generate an association response frame to define slot times for communications between other communications devices and the access point. In such embodiments, the frame builder 202 may also generate test frames such a beacons with TIM elements to trigger a response from two or more other communications devices to determine whether or not the communications devices may have a communications collision. And, in response to detecting such a collision, the MAC sublayer logic 201 may reassign an association identifier to one of the communications devices involved in the collision to separate the time slots defined for the communications devices to avoid subsequent communication collisions.

The PHY logic 250 may comprise a data unit builder 203. The data unit builder 203 may determine a preamble and the PHY logic 250 may encapsulate the MPDU with the preamble to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise diplexers 216 connected to antenna array 218. Thus, in this embodiment, a single antenna array is used for both transmission and reception. When transmitting, the signal passes through diplexers 216 and drives the antenna with the up-converted information-bearing signal. During transmission, the diplexers 216 prevent the signals to be transmitted from entering receiver 204. When receiving, information bearing signals received by the antenna array pass through diplexers 216 to deliver the signal from the antenna array to receiver 204. The diplexers 216 then prevent the received signals from entering transmitter 206. Thus, diplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of subcarriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

After receiving a frame, the MAC sublayer logic 201 may access frame structures in memory to parse the frame to determine, e.g., whether the access point is buffering data for the communications device, the bit position of the bit, the beacon sequence number, and/or the like. Based upon this information, the MAC sublayer logic 201 may determine a slot time for communicating with an access point. The MAC sublayer logic 201 may communicate with the access point by transmitting a trigger frame to trigger the access point to transmit the data being buffered for the communications device by the access point to the communications device.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

Figure 3A:
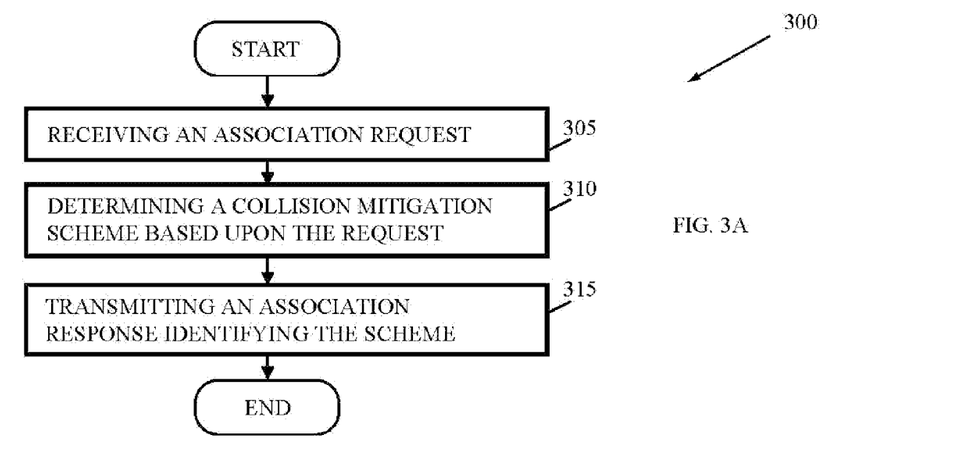
FIG. 3A-C depict embodiments of flowcharts to mitigate communication collisions.
Figure 3B:
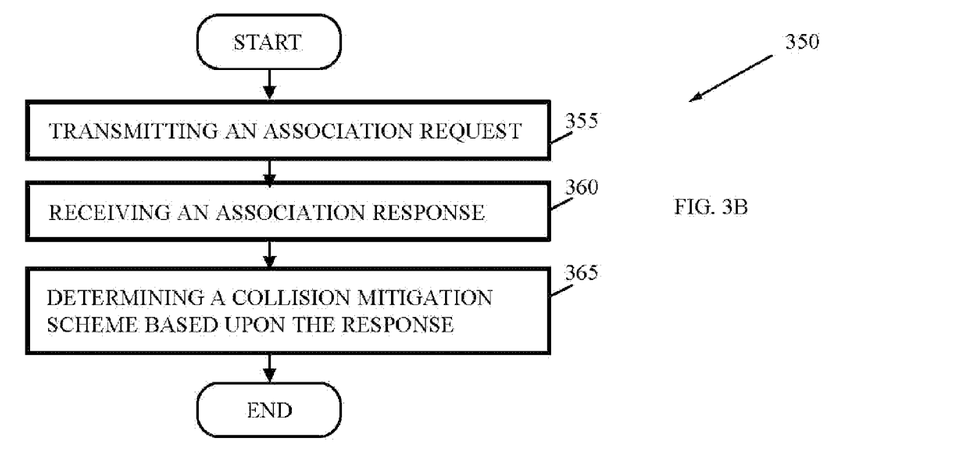
Figure 3C:
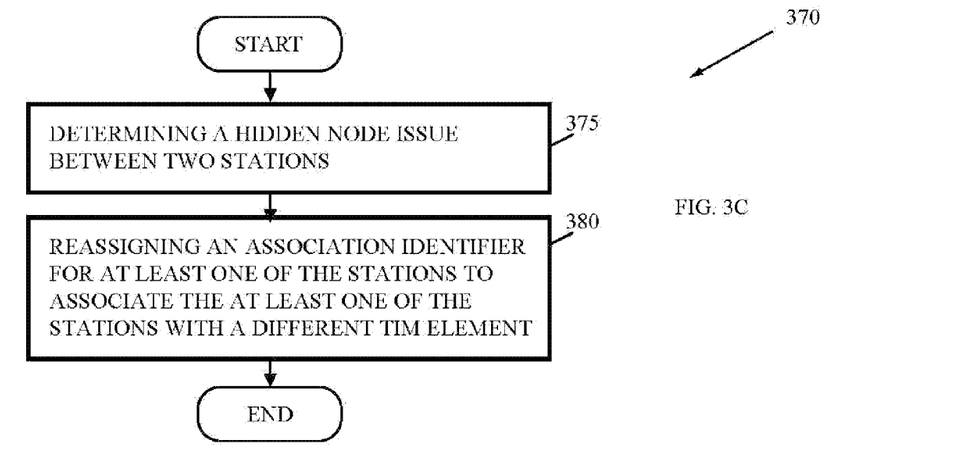

FIG. 3A-C depict embodiments of flowcharts to establish a collision mitigation scheme between communications devices such as an access point and a station. In particular, FIG. 3A depicts an embodiment of a flowchart 300 for an access point to establish a collision mitigation scheme between a communications device and the access point. The flowchart 300 begins with a medium access control (MAC) sublayer logic receive an association request from a communications device (element 305). In some embodiments, the MAC sublayer logic may receive an association request from a communications device and, based upon the request, the access point may determine an association identifier to assign to the communications device as well as a collision mitigation scheme (element 310). The MAC sublayer may determine the collision mitigation scheme based upon a default scheme predetermined for the access point or based upon a setting by an administrator of the access point. In further embodiments, the default scheme may be set in firmware of the access point at the manufacturing facility. In some embodiments, the scheme or schemes available in the memory of the access point may be updated with a firmware update.

After determining the collision mitigation scheme, the MAC sublayer logic may transmit a response to the association request that defines the collision mitigation scheme (element 315). For example, the MAC sublayer logic may include one or more bits in the association response in accordance with the structure of the association response frame that identifies to the communications device the particular collision mitigation scheme to be implemented by the communications device. In some embodiments, defining the collision mitigation scheme may involve identifying to the communications device a collision mitigation scheme stored in the memory of the communications device. In further embodiments, defining the collision mitigation scheme may involve identifying the collision mitigation scheme as well as one or more selectable features of the collision mitigation scheme to the communications device. Selectable features may include the use of a permutation table, the use of fair access logic, the use of a random number to determine a time slot, the use of a bit position to determine a time slot, and the like.

In other embodiments, defining the collision mitigation scheme may involve communicating one or more instructions to determine the process of the collision mitigation scheme. For example, in one embodiment, the access point may transmit a permutation table to the communications device for provision of fair access to the communications device and other communications devices.

FIG. 3B depicts an embodiment of a flowchart 350 for a communications device such as a station to determine a collision mitigation scheme. The flowchart 350 begins with MAC sublayer logic to determine an association response frame, transmit the association response frame to the physical layer logic for encapsulation with a preamble, and the physical layer logic to transmit the association request to a communications device such as an access point (element 355). The PHY logic may receive a response to the association request, decapsulate the association response, and pass the MAC protocol data unit to the MAC sublayer logic for parsing and interpretation (element 360). For instance, when a station is first activated in the vicinity of an access point for which the station is setup to associate, the station may transmit an association request packet to the access point to request the association. The association request may comprise a unique identification for the station such as a MAC address and, in many embodiments, additional information about the station including communication protocols and capabilities. In the present embodiment, the association request may also include information descriptive of collision mitigation schemes or related features that the station is capable of implementing. The station may be capable of implementing such features due to inclusion of instructions and data included in the memory of the station.

In response to receiving the association request, the access point may transmit a unique identifier for the association comprising an association identifier and, in the present embodiment, information that defines to the station the collision mitigation functionality that the station will perform to determine the time slots during which the station may communicate with the access point. In many embodiments, the station may also implement a process to respond to communication collisions such as retrying a particular number of times after established delay periods or waiting to retry until after receipt of a subsequent beacon that identifies a subsequent time slot during which the station may communicate with the access point.

FIG. 3C depicts an embodiment of a flowchart 370 for an access point to determine a collision mitigation scheme. The flowchart 370 begins with MAC sublayer logic of an access point determining the existence or potential existence of a hidden node issue between two stations (element 375). The MAC sublayer logic may include the capability of determining hidden node issues in addition to or in lieu of other processes of collision mitigation discussed in flowcharts 300 and 350. In particular, the MAC sublayer logic may receive an indication of a hidden node issue from user input, from testing the link quality for a station, or by actively testing stations for hidden node issues. For example, the access point may test the link quality or notice, while monitoring the link quality, that the link quality with one or more of the stations is weak or has lower data rates than expected or than a threshold data rate stored in memory or determined by the access point. The weak data rates may be indicative of a station being at the outer limits of that station's transmission capabilities. In some embodiments, the access point may determine that the weak signal or the indication of a potential hidden node issue from a user is sufficient to take action to address the issue. In further embodiments, the access point may actively test communications with stations to determine whether a hidden node issue is likely to exist between the two stations.

The access point may address a hidden node issue or a potential hidden node issue by reassigning an association identifier for at least one of the stations to associate the at least one of the stations with a different TIM element. For instance, if the two stations have communications that overlap, changing the association identifier for one of the stations may help avoid the triggering of a poll frame from the stations by a TIM element when both stations have data buffered at the access point during the same beacon interval. Furthermore, if two stations have sufficiently close association identifiers that transmission of a TIM element may cause the two stations to have overlapping communications despite setting distinct time slots for the stations, the access point may, in addition to establishing the time slots, assign a new association identifier to one of the two stations to separate the transmission of traffic indications to the respective stations by a unit of time such as by one or more beacon intervals.

Figure 4A:
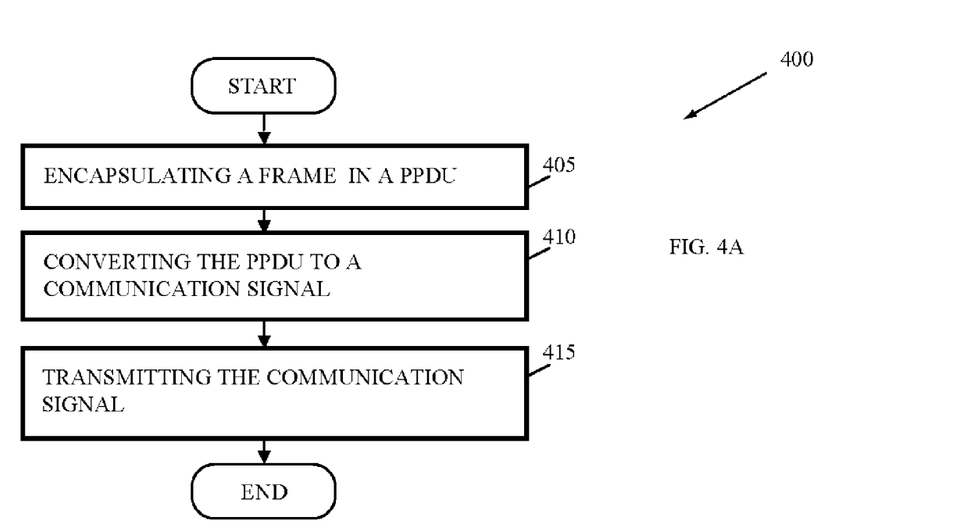
FIGS. 4A-B depict embodiments of flowcharts to mitigate communication collisions as illustrated in FIG. 2.
Figure 4B:
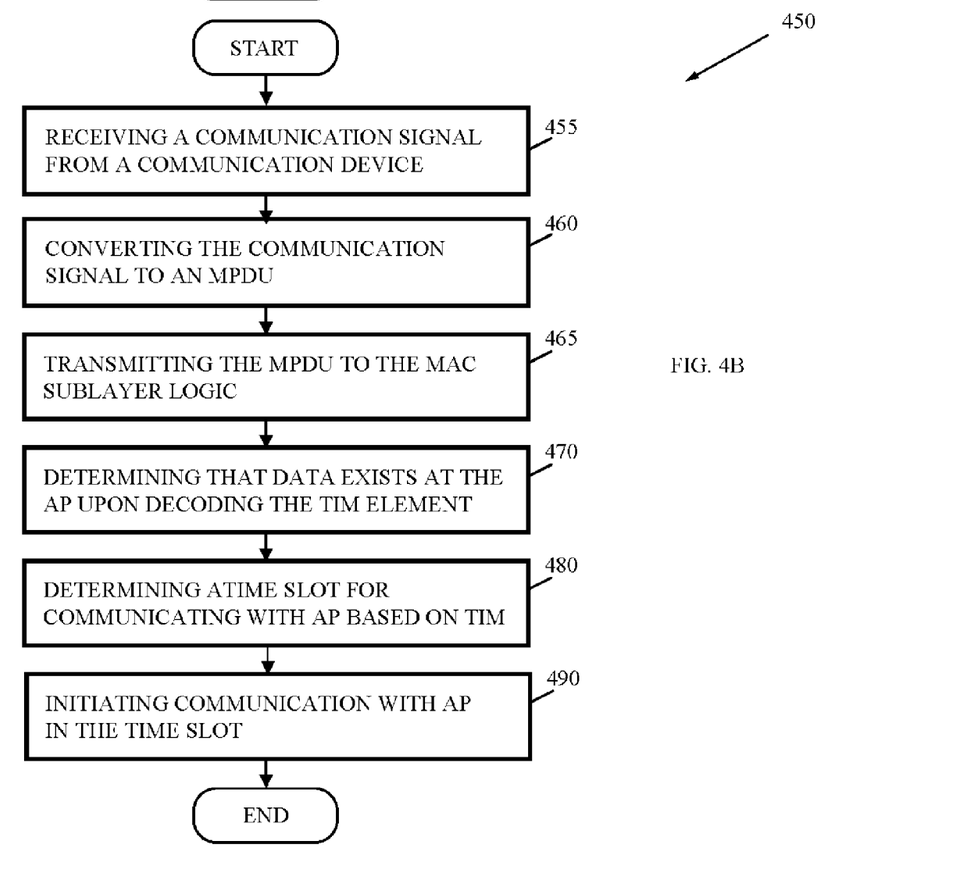

FIGS. 4A-B depict embodiments of flowcharts 400 and 450 to transmit, receive, and interpret communications to mitigate communication collisions such as the system described in conjunction with and illustrated in FIGS. 1 and 1A-D. Referring to FIG. 4A, the flowchart 400 may begin with receiving a frame from the frame builder and determining a preamble to transmit the frame such as an association request or response frame, a beacon frame with a TIM element, or a power-saving poll frame. The MAC sublayer logic of the communications device may generate the frame as a management frame to transmit to a communications device and may pass the frame as an MAC protocol data unit (MPDU) to a data unit builder that transforms the data into a packet that can be transmitted to the communications device. In particular, the data unit builder may generate a preamble to encapsulate the PHY service data unit (PSDU) (the MPDU from the frame builder) to form a PHY protocol data unit (PPDU) for transmission (element 405). In some embodiments, more than one MPDU may be encapsulated in a PPDU.

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of communications device such as the receiver 204 in FIG. 2 receiving a communication signal via one or more antenna(s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465).

The MAC sublayer logic may determine that a bit indicative of the association identifier for the communications device frame is set to a logical one indicating that data is being buffered by the access point for the communications device (element 470). In response to determining that the access point is buffering data, contention window logic of the MAC sublayer logic may determine the time slot for communicating with the access point (element 480). For instance, the MAC sublayer logic may multiply a slot time defined by the access point by a random number to determine the time slot for communication. In other embodiments, the MAC sublayer may divide the beacon interval by a number of stations associated with the TIM element or by a number of stations for which the access point is buffering data and multiply the slot time by a bit position of the communications device. In a further embodiment, the MAC sublayer may divide the beacon interval by a number of stations associated with the TIM element or by a number of stations for which the access point is buffering data and multiply the slot time by a number, Q, output by fair access logic in response to an input of the bit position, B, of the communications device. In still other embodiments, the slot time may be provided in the beacon frame so the MAC sublayer may parse to the beacon frame to determine the slot time.

After determining the time slot for communication with the access point, the MAC sublayer may initiate a communication with the access point by transmitting a trigger frame to trigger transmission of the buffered data to the communications device (element 490).

The following examples pertain to further embodiments. One example comprises a method. The method may involve defining, by a first communications device, time slots for other communications devices, the time slots defining a dedicated contention window for each of the other communications devices to wirelessly transmit a packet to the first communications device; and assigning, by the first communications device, the time slots to the other devices by transmitting one or more traffic indication maps to the other communications devices.

In some embodiments, the method may further comprise transmitting, by the antenna, the frame encapsulated by the preamble. The method may further comprise storing, by the medium access control sublayer logic, at least part of the frame in memory. In further embodiments of the method, defining the time slots comprises determining a communication collision issue between two of the other communications devices and reassigning an association identifier to a first of the two other communications devices, wherein the association identifier is grouped with a set of association identifiers that is transmitted in a different beacon than an association identifier of a second of the two other communications devices. In some embodiments of the method, defining the time slots comprises determining a collision mitigation scheme based upon a request for an association with at least one of the other communications devices with transmission of a response to the request. In some embodiments of the method, determining the collision mitigation scheme comprises determining that a contention window is calculated by multiplying a random number by a slot time. In some embodiments of the method, determining the collision mitigation scheme comprises defining a slot time based upon a number of communications devices associated with a traffic indication map. In some embodiments of the method, determining the collision mitigation scheme comprises determining that a contention window is determined by bit positions associated with the other communications devices within the traffic indication map. And, in some embodiments of the method, determining the collision mitigation scheme comprises determining that a contention window is determined by fair access logic of the other communications devices, wherein the fair access logic changes an order of assignment of time slots to the other communications devices associated with a first beacon transmission to a different order of assignment of time slots to the other communications devices associated with a subsequent beacon transmission.

At least one computer program product for communication of a packet with a short frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control sublayer logic to define time slots for other communications devices, the time slots defining a dedicated contention window for each of the other communications devices to wirelessly transmit a packet to the first communications device; and assigning the time slots to the other devices by transmitting one or more traffic indication maps to the other communications devices; and the physical layer logic to transmit one or more traffic indication maps to the other communications devices in periodic transmissions of packets.

In some embodiments, the apparatus may further comprise an antenna to transmit the frame encapsulated by the preamble. In some embodiments, the apparatus may further comprise memory to store at least part of the frame. In further embodiments of the apparatus, the medium access control sublayer logic to define the time slots comprises logic to determine a communication collision issue between two of the other communications devices and reassign an association identifier to a first of the two other communications devices, wherein the association identifier is grouped with a set of association identifiers that is transmitted in a different beacon than an association identifier of a second of the two other communications devices. In some embodiments of the apparatus, the medium access control sublayer logic to define the time slots comprises logic to determine a collision mitigation scheme based upon a request for an association with at least one of the other communications devices with transmission of a response to the request. In some embodiments of the apparatus, the logic to determine the collision mitigation scheme comprises logic to determine that a contention window is calculated by multiplying a random number by a slot time. In some embodiments of the apparatus, the logic to determine the collision mitigation scheme comprises logic to define a slot time based upon a number of communications devices associated with a traffic indication map. In some embodiments of the apparatus, the logic to determine the collision mitigation scheme comprises logic to determine that a contention window is determined by bit positions associated with the other communications devices. In some embodiments of the apparatus, logic to determine the collision mitigation scheme comprises logic to determine that a contention window is determined by fair access logic of the other communications devices, wherein the fair access logic changes an order of assignment of time slots to the other communications devices associated with a first beacon transmission to a different order of assignment of time slots to the other communications devices associated with a subsequent beacon transmission.

Another example comprises a system. The system may comprise at least one system comprising the apparatus according to any one or more of or all of the elements above and comprising an antenna coupled with the physical layer logic to transmit the frame. The system may further comprise memory to store at least part of the frame.

The following examples pertain to further embodiments. One example comprises a method. The method may involve defining, by a medium access control sublayer logic of a communications device, time slots for communicating with an access point, the time slots defining dedicated contention windows for the communications device to wirelessly transmit a packet to the access point; receiving, by the communications device, a frame comprising a traffic indication map; determining, by the communications device, a dedicated contention window for communication with the access point based upon the traffic indication map; and communicating, by the communications device, during the dedicated contention window with the communications device.

In some embodiments, the method may further comprise transmitting, by an antenna, the packet to the access point. The method may further comprise storing, by the medium access control sublayer logic, at least part of the frame in memory. In further embodiments of the method, reassigning an association identifier for communications device. In some embodiments of the method, defining the time slots comprises determining a collision mitigation scheme based upon a response from the access point to a request for an association with the access point. In some embodiments of the method, determining the collision mitigation scheme comprises determining that a contention window is calculated by multiplying a random number by a slot time. In some embodiments of the method, determining the collision mitigation scheme comprises determining a slot time based upon a number of communications devices associated with the traffic indication map. In some embodiments of the method, determining the collision mitigation scheme comprises determining that a contention window is determined by a bit position associated the traffic indication map. And, in some embodiments of the method, determining the collision mitigation scheme comprises determining that a contention window is determined by fair access logic, wherein the fair access logic changes an order of assignment of a time slot to the communications device for a sequence of beacon transmissions.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control sublayer logic to define time slots for communicating with an access point, the time slots defining dedicated contention windows for the communications device to wirelessly transmit a packet to the access point; receive a frame comprising a traffic indication map; determine a dedicated contention window for communication with the access point based upon the traffic indication map; and; and a physical layer logic to communicate during the dedicated contention window with the access point.

In some embodiments, the apparatus may further comprise an antenna to transmit the frame encapsulated by the preamble. In some embodiments, the apparatus may further comprise memory to store at least part of the frame. In further embodiments of the apparatus, the medium access control sublayer logic comprises logic to reassign an association identifier for communications device. In some embodiments of the apparatus, the physical layer logic comprises logic the medium access control sublayer logic comprises logic to determine a collision mitigation scheme based upon a response from the access point to a request for an association with the access point. In some embodiments of the apparatus, the logic to determining the collision mitigation scheme comprises logic to determine that a contention window is calculated by multiplying a random number by a slot time. In some embodiments of the apparatus, the logic to determining the collision mitigation scheme comprises logic to determine a slot time based upon a number of communications devices associated with the traffic indication map. In some embodiments of the apparatus, the logic to determining the collision mitigation scheme comprises logic to determine that a contention window is determined by a bit position associated the traffic indication map. In some embodiments of the apparatus, the logic to determining the collision mitigation scheme comprises logic to determine that a contention window is determined by fair access logic, wherein the fair access logic changes an order of assignment of a time slot to the communications device for a sequence of beacon transmissions.

Another example comprises a system. The system may comprise at least one system comprising the apparatus according to any one or more of or all of the elements above and comprising an antenna coupled with the physical layer logic to transmit the frame. The system may further comprise memory to store at least part of the frame. In some embodiments, the system may further comprise memory to store at least part of the frame.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, a dipswitch, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk—read only memory (CD-ROM), compact disk—read/write memory (CD-R/W), digital video disk (DVD)—read only memory (DVD-ROM), DVD-random access memory (DVD-RAM), DVD-Recordable memory (DVD-R), and DVD—read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method of wireless communication, comprising:
    wirelessly transmitting a beacon to multiple wireless communication devices, the beacon containing a traffic indication map (TIM), the TIM to indicate multiple slot assignments, each slot assignment to indicate when a separate one of the multiple wireless communication devices is permitted to transmit during a beacon interval subsequent to the beacon and
    receiving a communication from a particular one of the multiple wireless communication devices, the communication to occur during the slot assigned to the particular one of the wireless communication devices, wherein the communication from the particular one of the multiple communication devices is a power save poll.

2. An apparatus for communication, comprising:
    at least one processor and medium access control logic, configured to generate a beacon for wireless transmission to multiple wireless communication devices, the beacon containing a traffic indication map (TIM), the TIM to indicate multiple slot assignments, each slot assignment to indicate when a separate one of the multiple wireless communication devices is permitted to transmit during a beacon interval subsequent to the beacon and receive a communication from a particular one of the multiple wireless communication devices, the communication to occur during the slot assigned to the particular one of the wireless communication devices, wherein the communication from the particular one of the multiple communication devices is a power save poll.

3. The apparatus of claim 2, further comprising a transceiver.

4. The apparatus of claim 3, further comprising an antenna.

5. At least one non-transitory computer useable medium having a computer useable program code embodied therewith, the computer useable program code configured to perform operations comprising:

wirelessly transmitting a beacon to multiple wireless communication devices, the beacon containing a traffic indication map (TIM), the TIM to indicate multiple slot assignments, each slot assignment to indicate when a separate one of the multiple wireless communication devices is permitted to transmit during a beacon interval subsequent to the beacon and receiving a communication from a particular one of the multiple wireless communication devices, the communication to occur during the slot assigned to the particular one of the wireless communication devices, wherein the communication from the particular one of the multiple communication devices is a power save poll.

6. A method of wireless communication, the method comprising:

wirelessly receiving a beacon generated by a wireless communication device, the beacon containing a traffic indication map (TIM), the TIM indicating multiple slot assignments, a particular one of the slot assignments indicating when the apparatus is permitted to transmit during a beacon interval subsequent to the beacon and transmitting a communication to the wireless communication device during the particular slot assignment, wherein the communication to the wireless communication device is a power save poll.

7. An apparatus for communication, comprising:

at least one processor and medium access control logic, configured to receive a beacon generated by a wireless communication device, the beacon containing a traffic indication map (TIM), the TIM indicating multiple slot assignments, a particular one of the slot assignments indicating when the apparatus is permitted to transmit during a beacon interval subsequent to the beacon and transmit a communication to the wireless communication device during the particular slot assignment, wherein the communication to the wireless communication device is a power save poll.

8. The apparatus of claim 7, further comprising a transceiver.

9. The apparatus of claim 8, further comprising an antenna.

10. At least one non-transitory computer useable medium having a computer useable program code embodied therewith, the computer useable program code configured to perform operations comprising:

receiving a beacon generated by a wireless communication device, the beacon containing a traffic indication map (TIM), the TIM indicating multiple slot assignments, a particular one of the slot assignments indicating when the apparatus is permitted to transmit during a beacon interval subsequent to the beacon and transmitting a communication to the wireless communication device during the particular slot assignment, wherein the communication to the wireless communication device is a power save poll.

\* \* \* \* \*